May 10, 1960
W. E. PERKINS ET AL
2,935,777
PIPE LINING APPARATUS
Filed Feb. 11, 1957
4 Sheets-Sheet 1
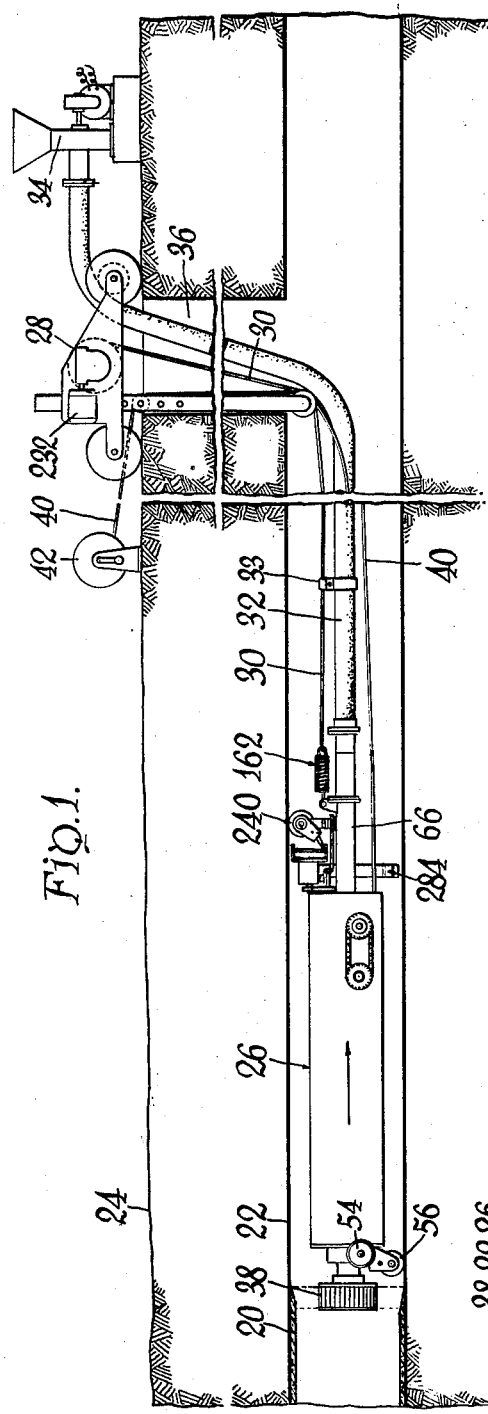
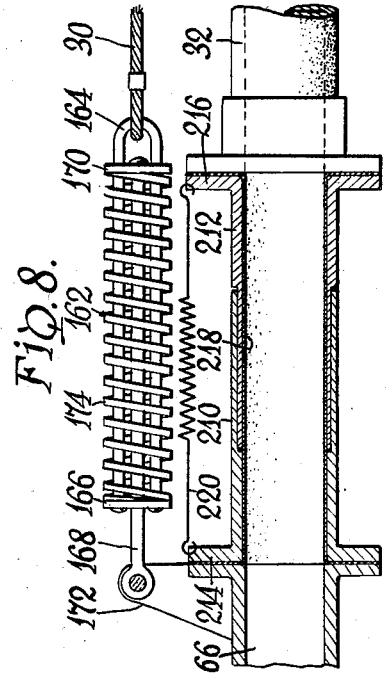
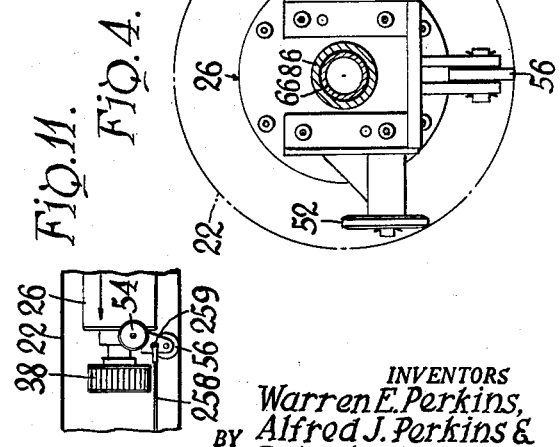
INVENTORS
Warren E. Perkins,
BY Alfred J. Perkins &
Robert J. Szpakowski,
Bean, Brooks, Buckley + Bean.
ATTORNEYS.

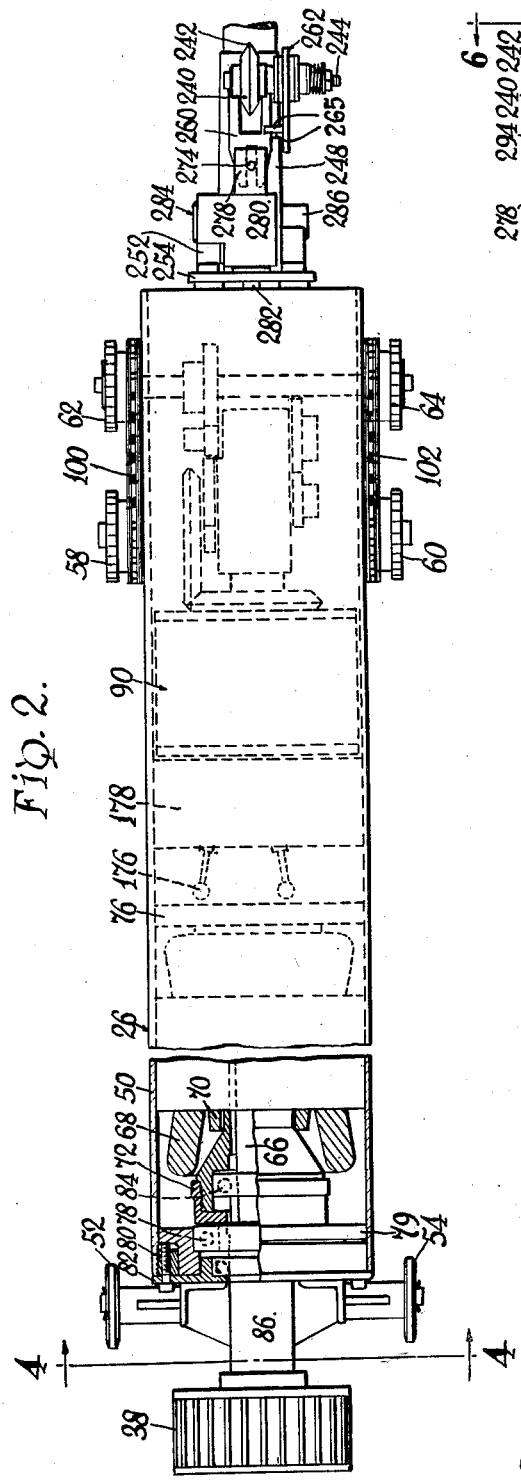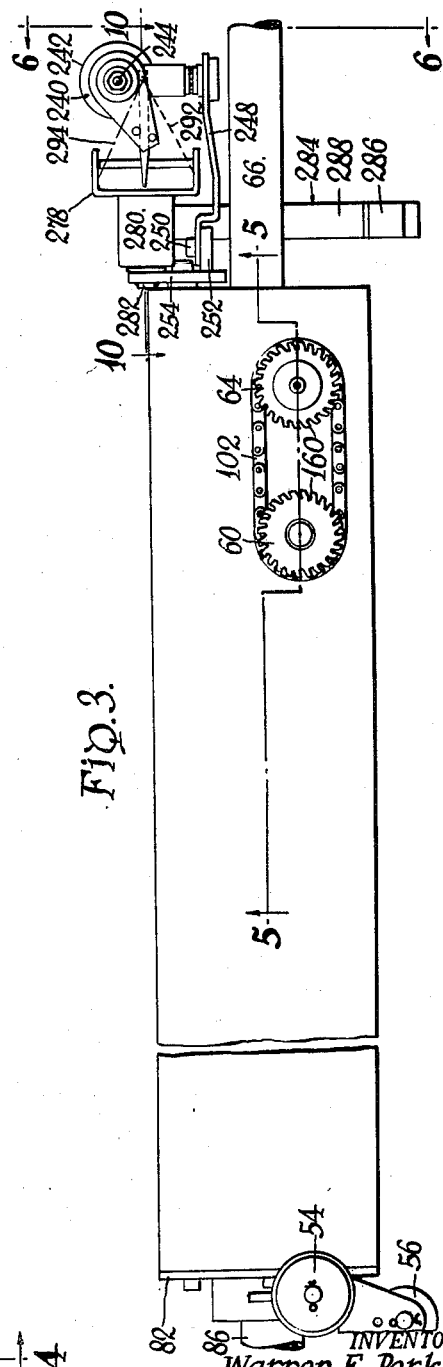

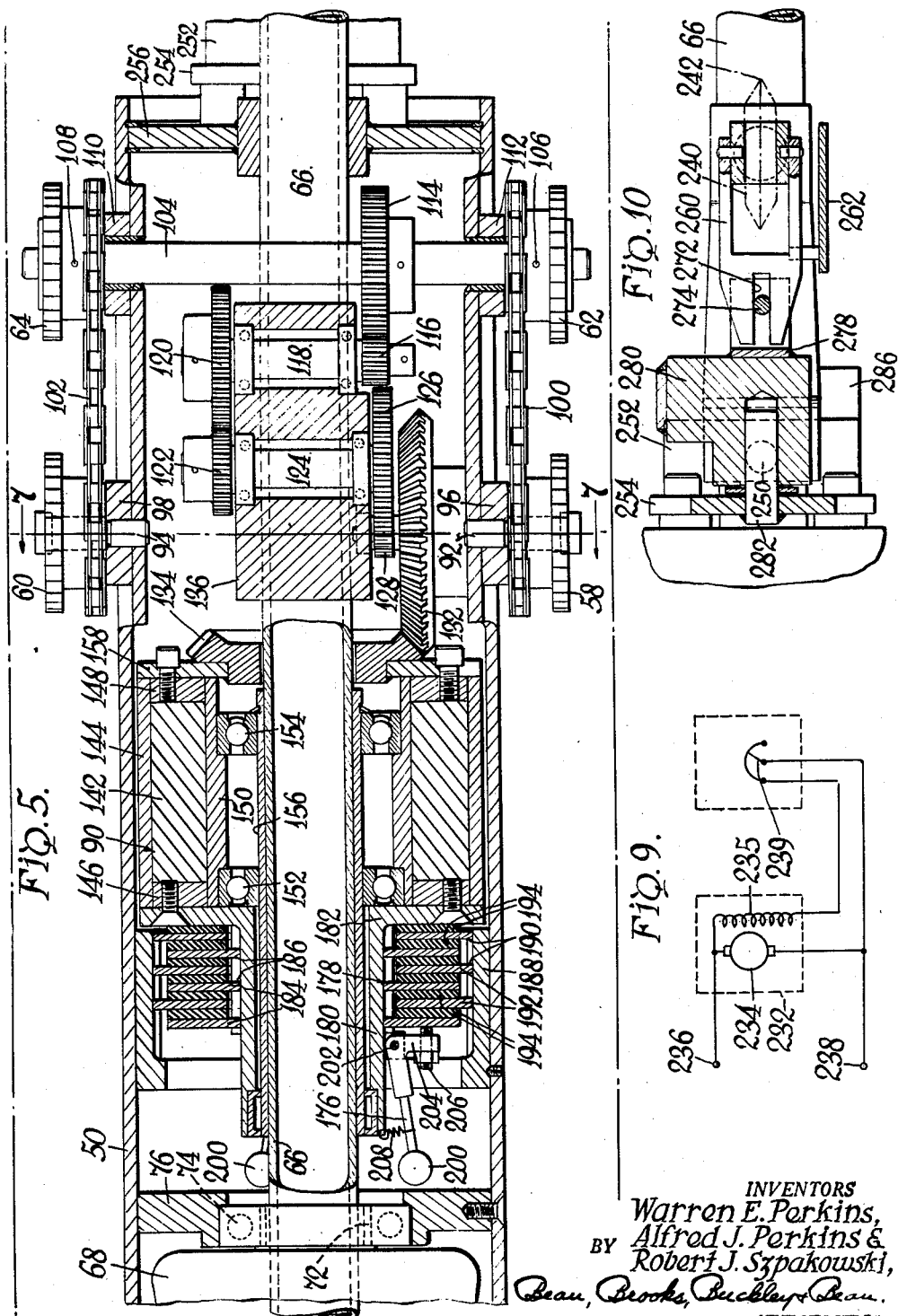

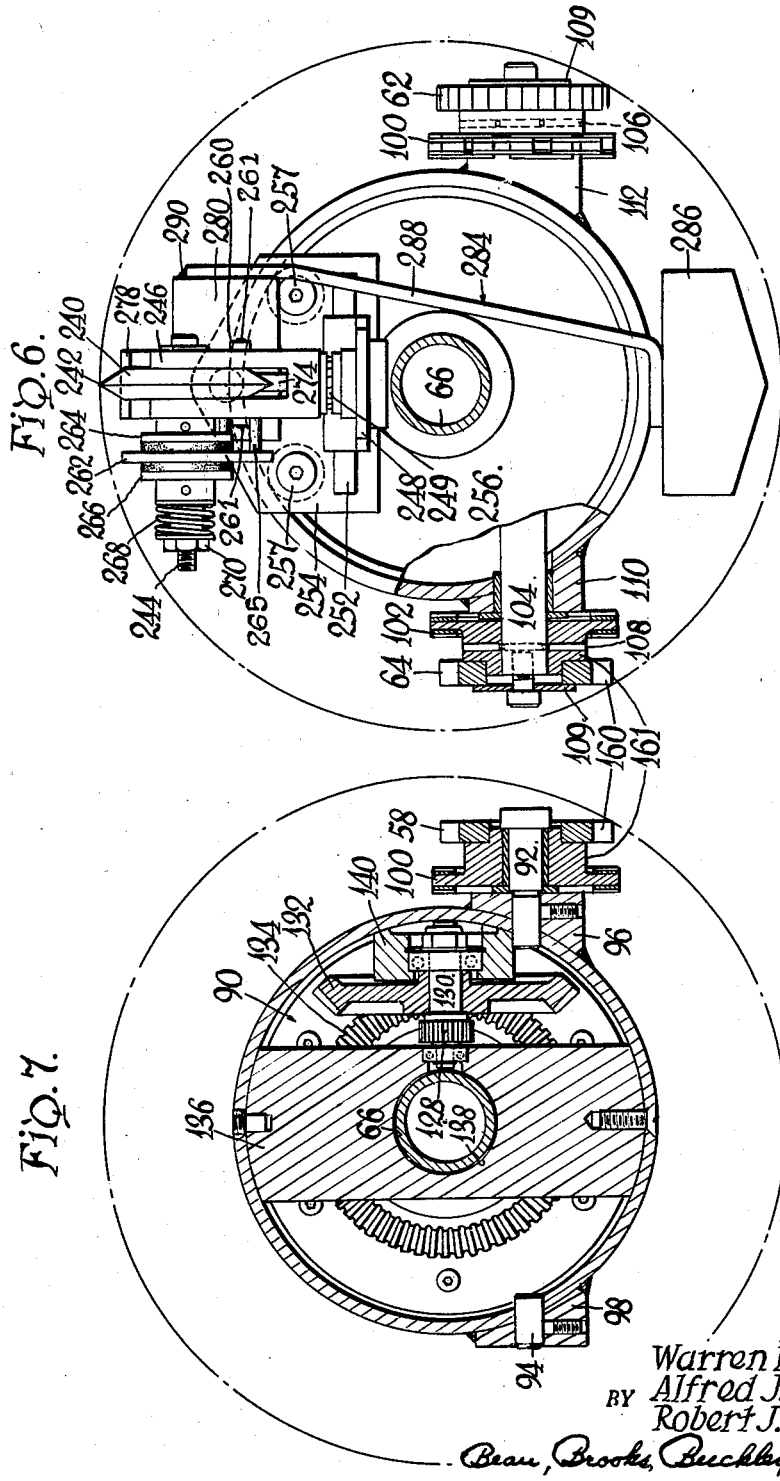

United States Patent Office 2,935,777
Patented May 10, 1960

2,935,777

PIPE LINING APPARATUS

Warren E. Perkins, Grand Island, N.Y., Alfred J. Perkins, Medulla, Fla., and Robert J. Szpakowski, North Tonawanda, N.Y., assignors to Perkins Pipe Linings, Inc., Grand Island, N.Y.

Application February 11, 1957, Serial No. 639,348

7 Claims. (Cl. 25—38)

This invention relates generally to apparatus for applying a protective coating of mortar or like material to the inner walls of pipe lines, conduits and the like, and more particularly to motion control facilities for the lining applying machine of such an apparatus, especially where the machine is adapted to travel through a pipe or similar conduit line of relatively small diameter while applying a coat of lining material thereto.

One type of apparatus available heretofore for lining pipes or the like in place in the ground includes a coating material applying machine which moves through the pipe while progressively applying coating material to the interior surface of the pipe by centrifugal distributor means, examples of this type of apparatus being shown in U.S. Patents No. 2,108,319; 2,262,647 and others. The particular machines shown in those patents are typical of the general kind suitable for lining pipes of fairly large diameter; more recently efforts have been directed toward the adaption of the principle of the centrifugal distributor type lining machine to apparatus for the lining of smaller diameter pipes, for example as shown in U.S. Patent No. 2,758,352.

Although it has been long desired to apply the rotary distributor lining applying technique to pipes of progressively smaller diameters, progress in this direction has been retarded by the fact that many problems in the construction of machines for this purpose become increasingly formidable as the diameter of the pipe which the apparatus is to line is reduced. One of the foremost of these problems is control of the motion of the lining applying machine within the pipe, since for economical operation this machine must travel for long distances through the pipe, often up and down steep grades as the pipe line follows the surface of the terrain in which it is buried. At the same time other portions of the apparatus, such as the lining material supply conduit and power supply and control cables and, often, a troweling device connected to the machine travel through the pipe line with the lining machine, as in the general scheme shown in the aforesaid U.S. Patent No. 2,758,352, for example. It will be understood that substantial uniformity of speed of travel of the machine is highly desirable, and avoidance of sudden changes in machine travel speed is a practical necessity if an evenly distributed application of lining is to result. At the same time it has been found that the management of the motion of the machine within the pipe should be such as to maintain the machine in an upright position in the pipe, that is prevent its rotation therein as it travels therethrough, since otherwise troublesome problems of twisting of the mortar supply conduit and the power supply and control cables, as well as of the trailing trowel, if any, would result.

As set forth above, satisfaction of the foregoing requirements of motion control become increasingly difficult as the diameter of the pipe in which the machine is to operate is reduced. In order to negotiate bends in the pipe, the length as well as the lateral limensions of the machine must be held to a minimum so that it becomes increasingly difficult to find space in the machine for a motor large enough to propel the machine through the pipe. Also since the motion control wheels or the like of the machine must be large enough in diameter to assure good traction properties, it will be seen that as the diameter of the pipe being lined is reduced the axes of these wheels, in a compact machine, become more nearly diametrical of the pipe so that usual steering concepts become inapplicable; at the same time, as the center of gravity of a compact machine becomes more nearly on the axis of the pipe, natural rotational stability of the machine is reduced or eliminated.

In accordance with the present invention, an improved pipe lining apparatus of the centrifugal distributor type is provided wherein the lining applying machine is drawn through the pipe being lined by a remote power source in a manner stabilized and controlled at the machine itself, the machine having traction means operating generally in opposition to the pull of the draw cable or other like device connecting the machine to the remote power source, but operable to both add and subtract from the action of that draw cable at the machine as needed to render the motion at the machine uniform. In a preferred form of the apparatus the motion control means at the machine is adapted to establish even the average speed of operation of the machine so that the effects of terrain grades and the like are neutralized, control of the final motion inducing effect of the remote pulling source being centralized at the machine in a manner operating to negative the effect of variables in the operation of the means connecting the remote source to the machine. At the same time means cooperating with the traction means at the machine are provided to supervise the rotational position of the machine in the pipe being lined and to make constant shifting, as opposed to steering, adjustments of that rotational position so as to maintain the machine in the desired upright position while at no time altering its needed coaxial alignment within the pipe.

Accordingly a major object of the invention is to provide a pipe lining apparatus, of the type including a lining applying machine adapted to travel through the pipe to be lined, having improved motion control means for the machine.

Another object of the invention is to provide improved apparatus as aforesaid having motion control traction means at the machine cooperative with remote means supplying the mechanical power for propulsion of the machine through the pipe.

Still another object of the invention is to provide improved apparatus as aforesaid wherein the motion control means comprises automatic means to supervise the rotational position of the machine in the pipe and to adjust that position by rotational shifting motions to a predetermined orientation relative to the pipe.

A further object of the invention is to provide improved apparatus as aforesaid wherein the longitudinal motion control means of the machine is adapted to absorb and release energy derived from the remote source of mechanical propulsion force so as to eliminate rapid changes in speed of travel of the machine through the pipe being lined.

Still another object of the invention is to provide improved apparatus as aforesaid having speed supervising means at the machine adapted to limit the rate of travel of the machine through the pipe so as to prevent excess speed of travel during the negotiation of downgrades or for any other reason.

Still another object of the invention is to provide improved apparatus as aforesaid having remotely powered machine propulsion means wherein the traveling pipe lining machine itself has supervision over the operation of the remote power means.

Other objects of the invention will be apparent from the foregoing general discussion and from the following description and claims, and from the drawings wherein:

Fig. 1 is a fragmentary general view, partly in section, showing pipe lining apparatus in accordance with the present invention in use;

Fig. 2 is a fragmentary top plan view of the pipe lining machine of Fig. 1, on an enlarged scale, partly broken away and partly in section;

Fig. 3 is a fragmentary side elevational view corresponding generally to Fig. 2;

Fig. 4 is a sectional view taken about along line 4—4 of Fig. 2, turned 90° to correspond to the positions of Figs. 1 and 3;

Fig. 5 is a fragmentary bottom plan sectional view on a further enlarged scale, taken about along line 5—5 of Fig. 3;

Fig. 6 is a sectional view, with part of the background broken away, taken about along line 6—6 of Fig. 3 and drawn to the same scale as Fig. 5;

Fig. 7 is a fragmentary sectional view taken about along line 7—7 of Fig. 5, turned 180°;

Fig. 8 is an enlarged fragmentary detail view, partly in section, of a portion of the apparatus shown in Fig. 1;

Fig. 9 is a schematic wiring diagram of the winch motor circuit of the apparatus of Fig. 1;

Fig. 10 is a sectional view, on an enlarged scale, taken about along line 10—10 of Fig. 3; and Fig. 11 is a fragmentary view corresponding to a part of Fig. 1, showing the pipe lining machine of Fig. 1 being drawn into place in a pipe to be lined.

Referring more particularly to Fig. 1, a preferred form of pipe lining apparatus in accordance with the invention is shown in use in the applying of a lining 20 to a pipe 22 in place below the ground level 24, the apparatus including a pipe lining machine 26 adapted to be drawn through the pipe 22 by a winch device 28 to which it is connected by a cable 30. The cable 30 also serves to draw a flexible pipe lining material supply conduit 32 ahead of the machine as it travels through the pipe, the cable being clamped or otherwise connected to the hose at intervals therealong for this purpose, as indicated at 33. As in the general scheme of operation of machines of the kind shown in the aforesaid U.S. Patent No. 2,758,352, the conduit 32 supplies mortar or other suitable coating material from a source such as an electrically driven pump 34, through a manhold 36 or other convenient entrance to the pipe 22, to the pipe lining machine 26 through which the coating material passes and is dispensed by centrifugal action of a rotary distributor head 38. The distributor head 38 may be of the type illustrated in that Patent No. 2,758,352, for example, and is therefore not shown in detail herein. An electrical power supply and control circuit cable 40 is also brought from the machine 26 through the manhole 36 to the exterior and may be retracted as the machine proceeds through the pipe 22 during the lining operation by any suitable means illustrated, for example, as a simple hand operable reel 42 which of course would have suitable rotary contacts (not shown) for connection of the various circuits to the cable 40.

As best shown in Figs. 2, 3 and 4, the pipe lining machine 26 comprises an axially elongate cylindrical housing 50 supported in the pipe 22 coaxially therewith by a tricycle arrangement of idler wheels 52, 54, 56 at the end of the machine adjacent the distributor head 38, and by two pairs of traction wheels 58, 60 and 62, 64 at the opposite end portion of the machine. As in the patent referred to above, the machine 26 is of the type having a coating material feed conduit 66 extending straight through the machine on the axis of the housing 50 and forming a part of the machine, and mounted annularly about the feed conduit is a distributor head drive motor whose stator 68 is carried by the housing 50 and whose rotor 70 is carried by a hollow output shaft 72. The motor output shaft 72 is journaled to rotate about the feed conduit 66 by a bearing 74 (Fig. 5) carried by a cross member 76 in the housing 50 at one end of the motor and by a bearing 78 at the other end of the motor carried by a mounting ring 79 held by a retainer ring 80 threadedly engaged in the corresponding end of the housing 50 and serving also to mount the adjacent end plate 82 of the housing. As indicated in Fig. 2, a portion of the output shaft 72 is enlarged to house a bearing 84 which gives support to the distributor head end of the feed conduit 66 as it passes through a central opening of the end wall 82 within an output sleeve extension 86 of the output shaft 72, which sleeve 86 mounts the external rotor of the distributor head 38 as shown.

An important feature of the invention resides in the control of the rotation of the traction wheels 58, 60, 62, 64 for cooperation with the winch 28 in the propulsion of the machine 26 through the pipe 22 being lined. One important aspect of this feature is that the traction wheels are coupled to a high energy storage inertia device comprising a flywheel 90 by a reversibly operable transmission, as best shown in Fig. 5, so that the flywheel operates to absorb energy from, and deliver energy to, the traction wheels. As shown in that figure and Fig. 7, one pair of the traction wheels 58, 60 are journaled on stub axles 92, 94 carried by mount blocks 96, 98 on the machine housing 50, and are ganged with the other traction wheels 62, 64, as by chain drives 100, 102, to rotate therewith. The last mentioned pair of traction wheels 62, 64 are mounted on an axle shaft 104 by means of shear pins 106, 108 and thrust bearing plates 109, 109, the axle 104 being journaled in bearing blocks 110, 112 carried by the housing 50. The shear pins are adapted to remain intact under all normal loads between the wheels 62, 64 and their axle 104, but to release those wheels and the other traction wheels 58, 60 ganged thereto from the restraint of the motion control means connected to the shaft 104 when the pinned connection is subjected to a gross overload, after which the thrust bearing plates 109, 109 retain the wheels 62, 64 in place. Thus when it is desired to remove the machine 26 from the pipe 22 at high speed, the pins 107, 108 can be sheared by an intentional excessively heavy pull on the cable 30 of Fig. 1 (or the alternately utilized cable 258 of Fig. 11, the normal use of which is set forth hereinafter).

The axle shaft 104 is connected to the flywheel 90 by a speed step-up gear train which in the illustrated preferred embodiment of the invention has a ratio of about 30 to 1 and is reversible, that is, is capable of transmitting power from either end of the train to the other end. This gear train comprises a driving gear 114 fixed on the shaft 104 and engaging a smaller pinion 116 carried by a first intermediate shaft 118, the other end of which carries a gear 120 engaging a pinion 122 on a second intermediate shaft 124 which carries at its other end a gear 126 engaging another pinion 128 on a third intermediate shaft 130 which carries in turn a large bevel gear 132 engaging a bevel gear 134 attached to the flywheel 90. As shown, the first and second intermediate shafts 118, 124 are journaled in a cross member 136 mounted by the housing 50 and having an opening 138 passing the feed conduit 66, while the third intermediate shaft 130 is journaled at one end in the cross member 136 and at the other end in a block 140 also fixedly carried by the housing 50.

As aforesaid, a main purpose of removing the prime source of mechanical propulsion force from the machine 26 to the winch 28 is to minimize the size of the machine so as to enable manufacture of a machine of smaller dimensions than would be required to house a propulsion motor capable of propelling the machine through the pipe being lined. At the same time, to provide a uniform lining thickness, it is desired to maximize the stability of motion of the machine at the machine itself, and to this end the speed step-up ratio between the traction wheels and the flywheel 90 is made as high as practicable, so as to give the flywheel a high speed of rotation, and for cooperating with this high speed of rotation to provide maximum energy storage, the flywheel 90 is constructed to have a high moment of inertia within a configuration of minimum dimensions.

Accordingly, in the illustrated preferred embodiment of the invention, the flywheel 90 comprises an annulus 142 of a heavy material, preferably lead, mounted in an annular casing of a structural material such as steel comprising an outer annular wall 144, end walls 146, 148, and an inner annular wall 150 mounted by bearings 152, 154 on a reinforcing sleeve 156 shrunk or otherwise suitably fixed on the feed conduit 66. As shown, the bevel gear 134 on the flywheel may be provided with an annular flange 158 attached to the adjacent casing end wall 148 so as to in effect be part of the casing, rotatably mounted therewith by the bearings 152, 154 on the reinforced feed conduit 66.

For economical execution of a pipe lining operation, it is of course desirable that the length of pipe line treated with the external parts of the apparatus, such as the winch 28 and the pump 34, set up at a given manhole, excavation or other entrance to the pipe line 36 be as great as practicable, and therefore the machine 26 draw cable 30 and the coating material supply conduit 32 attached thereto may extend for many hundreds of feet from the coating machine 26 to the entrance 36 to the pipe utilized. Accordingly it will be understood that the fairly heavy draw cable 30 and the coating material laden supply conduit 32 will sag to the bottom of the pipe 22 between the machine 26 and the pipe entrance 36, so that the motion of the draw cable at the coating machine end thereof will be subject to irregularity due to the resulting friction, even if the speed of operation of the winch 28 is maintained substantially constant. Furthermore, the force requirement for inducing longitudinal motion of the machine would, if the machine were freely movable through the pipe, vary from moment to moment as the machine negotiates irregularities in the pipe line 22 such as pipe joints or the like, and this variation would tend to result in undesirable variation in motion of the machine. It will be seen that the inertia characteristic of the flywheel 90 as transmitted to the traction wheels 58, 60, 62, 64 precludes rapid changes of speed of travel of the machine, so that the machine acts as an anchor on the end of the draw cable strongly tending to smooth out the speed of motion of the end of the draw cable to which it is attached, the flywheel absorbing energy when the draw cable tends to move in an accelerating portion of a jerking movement, and yielding energy to the traction wheels to actually propel the machine momentarily when the attached end of the draw cable slackens during the other portion of a jerking movement. For providing firm anchorage of the machine 26 in the pipe against sudden acceleration by the draw cable, it is preferred that the traction wheels have hard, sharply toothed traction surfaces or treads 160, with the teeth thereof set to bite in a hook-like manner into the interior pipe surface in a direction in opposition to the force applied by the cable 30, as best seen in Fig. 3 of the drawings. Conveniently, the toothed tread parts 160 may be separate elements fixedly attached, as by a pressed fit, to the wheel body elements 161.

For further enabling the anchorage provided by the machine 26 to absorb and oppose the variations in the force applied by the draw cable 30, it is preferred that the connection between the draw cable and the machine be made through a heavy spring coupling 162 such as is shown in Figs. 1 and 8 wherein the coupling is illustrated to comprise a U-shaped member 164 connecting the cable 30 to a washer element 166, and a rod 168 carrying a second washer 170 and pivoted at its other end to a mounting arm 172 attached to the machine 26 at the feed conduit 66 thereof, a compression spring 174 being arranged between the washers 166 and 170 of the coupling to transmit the force of the draw cable 30 therethrough.

There are operating conditions under which constancy of speed of operation of the winch 28 and averaging of that speed by the inertia means at the machine to eliminate the effect of jerking movements in the draw cable would not suffice to insure sufficient constancy in speed of motion of the machine 26, for example where the machine negotiates a steep downward grade in the pipe line so that it would tend to gradually speed up and overtake the draw cable. To obviate this difficulty, means are provided to retard the machine against overspeed operation, and in the illustrated embodiment of the invention these means comprise a governor 176 operable to engage a brake mechanism 178 in accordance with the degree of overspeed.

As shown in Fig. 5, this mechanism includes a tubular rotor 180 mounted by an annular flange 182 secured to one end wall 146 of the flywheel casing so as to encircle the feed conduit 66 and rotate with the flywheel 90. This rotor sleeve 180 carries a plurality of annular brake plates 184 by means of axially slidable splined connections 186 thereto, and a corresponding brake stator member 188 is fixed to the machine housing 50 to mount, in a similar axially slidable splined arrangement 190, a plurality of rotationally stationary annular brake plates 192. Annular discs 194 of brake lining or like material are inserted between the opposing brake plates 184, 192, and between the brake rotor flange 182 and the adjacent stator brake plate, so that it will be understood that a braking force will be applied from the machine frame housing 50 to the flywheel, and thus to the traction wheels, when the aforedescribed assembly of interleaved rotary and non-rotary brake members undergoes axial compression. This axial compression is provided by the governor device 176 which comprises a plurality of flyball type arms 200 each pivoted as at 202 to the brake rotor sleeve 180 and carrying a brake operator arm 204 arranged to bear against the outermost rotary brake plate through an adjustable length stud 206 when the flyball arms 200 swing radially against the action of returning springs 208 in response to an overspeed condition.

Since the coating material supply conduit 32 is attached to the draw cable 30 as aforesaid, it is necessary or highly desirable that a motion disparity take-up be provided in the supply conduit, companion to the spring connection 162 between the cable 30 and the machine 26. As shown in Fig. 8, this coating material supply line motion disparity take-up may be of the kind comprising a pair of telescoping tubular members 210, 212 forming a longitudinally extensible unit having flanges 214, 216 at its opposite ends which form coupling devices to the feed conduit 66 and a coupling at the outlet end of the supply conduit 32, respectively, as well as anchorages for a longitudinally elastic liner 218 providing internal continuity to the telescoping motion take-up device for free lining material flow therethrough. The liner 218 biases the telescoping coupling toward a contracted condition against the pull of the supply conduit 32, and it may be assisted in this function by tension springs 220 stretched between the flanges 214, 216 as shown.

Referring again to the operation of the brake 178, under certain operating conditions it is sufficient that the brake engage only upon overspeed, such as to prevent the machine from overtaking the draw cable 30 when the machine is negotiating down grades, sufficient constancy of speed of machine travel being assured by such on-off operation of the brake 178 in cooperation with the flywheel 90 and essential constancy of speed of draw upon the cable 30 by the winch 28. However, there are other operating conditions where it is preferred that the control of the speed of travel of the machine be more completely centered in the machine itself, for example where the draw cable 30 has an elastic characteristic sufficient to permit periodic stretching of the cable which might leave the machine underpowered for periods lasting too long for adequate compensation by the effect of the fly wheel 90.

Therefore, for providing the desired centralization of travel speed control at the machine, it is preferred that the governor 176 be adjusted to engage the brake 178 partially at the normal operating speed and to provide more and less braking action upon overspeed and underspeed operation of the machine, respectively. This will tend to maintain the cable 30 in stretched condition for more even motion of the end thereof attached to the machine. Accordingly although the actual pull of the cable 30 on the machine may vary as the cable tends to stretch and contract, the speed of travel of the machine will be maintained substantially constant since the brake 178 will act in a compensating manner to match the force necessary to propel the machine at the desired constant speed to the pull delivered by the cable.

Since the foregoing travel motion control means of the machine reduce and compensate for the variables in the operation of the draw cable 30, the operation of the winch 28 can be and desirably is, such that the speed of the cable 30 as it is taken in by the winch is substantially constant. Any appropriate winch structure may be used for this purpose, this constancy of effective operating speed being indicated herein in Fig. 9 where it is illustrated schematically that the motor 232 of the winch 28 may be a substantially constant speed D.C. motor having an armature 234 and a shunt field 235 connected in a conventional manner across supply terminals 236, 238. Desirably the nominal value at which the speed of the motor is substantially constant is adjustable, as by a resistor 239 in the shunt field circuit, so that this nominal value may be adjusted if necessary; for example, to maintain the cable draw speed substantially constant in cases where the winch employed is of the kind wherein the effective diameter of the cable drawing reel of the winch increases as cable is taken in thereon.

It will be understood that the particular winch 28 and its driving means 232 as shown are illustrative only of any of various arrangements which could be employed to the same end; for example the winch drive could be powered by another kind of motor, with provision of suitable control means, if needed, for drawing the cable 30 at the desired constant speed. So also it will be understood that the governor and brake mechanism 176, 178 of the machine could be embodied otherwise than as shown; for example this mechanism could be of a hydraulic kind employing a pump coupled to the machine traction wheels 58, 60, 62, 64 and arranged to force its output fluid through an orifice acting as a variable load so as to function both as a governor means and as a brake means responsive thereto.

As aforesaid, means are provided to complete the motion control of the machine 26 by maintaining it in a desired upright position as it is propelled through the pipe line 22. In order to preserve the compactness of the machine 26 and the coaxial relation thereof within the pipe 22 while providing a machine righting force sufficient to overcome the high friction of the traction wheels 58, 60, 62, 64 which would tend to maintain the machine in an undesired rotationally tilted position, this position correcting means is in the form of a machine twisting device comprising a high lateral friction treading means in the form of a wheel 240 mounted at the same end of the machine as the high friction characteristic traction wheels but in a position to bear against the opposite wall of the pipe 22 therefrom so as to be in opposition thereof. Accordingly the machine twisting wheel 240 and the traction wheels 58, 60, 62, 64 oppose each other in the pipe 22 so as to force each other into firm contact on the inner pipe wall. For providing the desired high lateral friction in its treading engagement on the pipe, the twisting wheel 240 is provided at its pipe bearing edge with a sharp cutting characteristic such as provided by the sharp, knifelike edge 242 of the wheel in the illustrated preferred embodiment of the invention.

As best seen in Figs. 2, 3, 6 and 10 of the drawings, the machine twisting wheel 240 is fixedly mounted on a shaft 244, as by a key (not shown), which shaft 244 is journaled in a yoke 246 pivotally mounted on a spring arm 248 by a ball thrust bearing 249 to be twistable thereon. Preferably the pivot axis of the bearing 249 is generally vertical and disposed to pass approximately through the contact point of the wheel 240 with the pipe 22, for easy twistability of that wheel. The other end of the spring 248 is cantilever mounted as by a cap screw 250 on a flange 252 of a mounting plate 254 firmly attached to the adjacent end wall 256 of the machine housing, as by a pair of cap screws 257—257. The spring 248 has a normal set approximately as seen in Fig. 3, and is deflected downwardly to the position shown in Fig. 6 by the aforesaid yoke mount of the wheel 240 as the wheel bears against the pipe 22 in use. Thus it will be seen that the heavy, cantilevered spring arm 248 will engage the twisting wheel 240 firmly against the interior of the upper wall of the pipe 22 in a resiliently biased manner. It will further be seen that the angular position of the wheel, as it rotates on the axis of the yoke 246 provided by the bearing 249, will control the twisting motion inducing action of the wheel 240, so that if that wheel is in its normal position with its axis at right angles to the axis of the pipe 22, no machine twisting action will result, but if the wheel is twisted out of that position, it will exert a strong twisting force on the machine.

Accordingly means are provided to adjust the position of the yoke 246, and thus the position of the wheel 240, as required for maintaining the machine in the desired upright position or for supplying the twisting force needed for returning the machine to that position from a departure in either direction therefrom.

The normal direction of motion of the machine 26 is as shown by the arrow thereon in Fig. 1, wherein the distributor head 38 is at the trailing end of the machine in position to apply a coating to the pipe 22 therebehind. However there are operating situations in which it is desired to move the machine in a reverse direction through the pipe 22 as indicated by the arrow in Fig. 11, for example to bring the machine to a position in the pipe line at which actual pipe lining operations are to be commenced. As illustrated in that figure, an auxiliary draw cable 258 may be attached temporarily at 259 to the distributor head end of the machine for this purpose. Accordingly it is preferred that the means for controlling the angular position of the wheel 240 be operable in both directions of machine travel.

To provide this reversability, the rotational position of the yoke 246 is controlled by a tiller bar 260 pivotally mounted thereon at 261—261 (Fig. 6), the position of the bar 260 about the axis 261—261 being controlled by a reversing arm or plate 262 journaled on the axle 244 of the wheel 240 and connected to the bar 260 by pins 265—265 to form a sliding point thereto for this purpose. The reversing arm 262 is, in turn, arranged to be urged in the direction of rotation of the wheel by a spring loaded clutch. In the illustrated structure, this clutch comprises first and second clutch plates 264, 266 arranged to engage the tiller bar reversing plate 262, the clutch plates 264, 266 being mounted on the shaft 244 in keyed relation thereto so as to rotate therewith and being arranged to engage the plate 262, through friction washers as shown, under the urge of a spring 268 mounted on the shaft 244 between a retainer nut 270 and the adjacent, axially movable one of the clutch plates 266, the other clutch plate 264 being held against axial movement by bearing against the yoke 246. The end of the tiller bar 260 opposite its pivot mount 261—261 is provided with a forked formation 272 engaged on a control bar 274 mounted by a control yoke 278 having a mounting block or boss 280 by which it is pivotally mounted on an axis forming stud 282 carried by the mounting plate 254, which is rigidly fixed to the machine as aforesaid. The position of the control yoke 278 on its axis 282 is controlled by a pendulum 284, comprising a pendulum weight 286 and a pendulum arm 288 by which the weight depends from a rigid connection at 290 to the control yoke mounting boss 280.

Referring more particularly to the showing of Fig. 3, it will be seen that when the machine 26 is travelling in its normal, pipe lining depositing direction, which would be toward the right in that figure, the tiller bar 260 will be caused to assume the position shown by the dotted line at 292, due to the frictional engagement of the clutch plates 264, 266 on the tiller bar reversing plate 262 as the machine twisting wheel 240, rolling along the pipe 22, undergoes counterclockwise rotation as viewed in that figure. It will be seen that when the machine is in a proper upright position as illustrated in the drawings, the tiller bar will be maintained by the pendulum controlled linkage in a neutral position so far as its rotation on the twisting axis of the wheel mounting yoke 246 is concerned. On the other hand, if the machine assumes a position other than upright, the control yoke 278, maintained in a true upright position by the pendulum 284, will shift the tiller bar 260 in the direction needed to twist the wheel 240 on the axis of its mounting yoke 246, either clockwise or counterclockwise as viewed in Fig. 2 as needed to apply corrective twisting force to the machine as it travels through the pipe, the knife edge 242 of the wheel 240 treading on a temporarily spiral course on the inner upper wall of the pipe 22 during this corrective operation.

At such time as reverse motion of the machine 26 is executed through the pipe as shown in Fig. 11, it will be seen that the clutch 264, 266 will be operable to shaft the tiller bar 260, through the action of the clutch on the tiller reversing plate 262, to the position shown in dotted lines at 294 in Fig. 3. Thus the direction of operation of the linkage provided by the control yoke 278 and the tiller bar 260 will be reversed for proper correlation of the action of the pendulum 284 with the wheel 240 for maintenance of the machine in the desired upright position as it travels through the pipe line in the direction indicated by the arrow in Fig. 11.

Accordingly, the frictional mount of the tiller bar reversing control 262 on the machine shifting wheel assembly, and the control of the tiller bar by the two position pendulum operated yoke 278 serve to provide a linkage between the pendulum and the wheel 240 which automatically reverses in its operation with reversal of motion of the machine 26 so as to maintain the machine in upright position during either direction of travel through the pipe 22.

In summary, it will be seen that the present invention provides for complete control of the motion of the pipe lining machine 26 as it travels through the pipe 22 to be lined, in a manner which is especially adapted to enabling the machine to be constructed to dimensions for operation in the lining of very small diameter pipe, such as pipe less than 12 inches in diameter, although it will be understood that certain principles of the invention are appliacable to larger machines as well. Thus the "twisting" wheel assembly is operable to maintain the machine upright even when space considerations make it necessary that the machine have little or no natural rotational stability and where there would not be room for employment of ordinary "steering" techniques. At the same time this machine shifting or twisting mechanism is arranged in opposition to the high friction traction wheels of the machine where it not only cooperates therewith for application of firm treading pressures at both the twisting and traction wheels, but also is in position to apply its machine righting force adjacent to the location of the traction wheels, so as to overcome that greatest source of resistance to machine righting movement with little or no disturbance to the axial alignment of the machine in the pipe or to the desired coaxial relation between the machine distributor head 38 and the pipe being lined. Further, the rotation of the traction wheels is controlled at the machine itself in a manner to supervise the motion of the machine along the pipe, providing a firm anchorage to reduce the natural tendency toward irregular motion of the draw cable at the machine end thereof, and substantially eliminating transmission of such motion irregularities to the machine. Fnally, control of the use of the power derived from the remote constant speed of pull at the winch is had at the machine in such manner that the machine moves at a constant speed substantially unaffected by the variables inherent in the action of the intervening draw cable.

While only one embodiment of the apparatus of the invention has been illustrated and described in detail, it will be understood that the invention may be otherwise embodied within the spirit of the invention and the scope of the appended claims.

What is claimed is:

1. In a pipe lining apparatus, a pipe lining machine having a rotary distributor head adapted to apply lining material to the interior wall of a pipe while said machine travels therethrough, and motion control means for said machine comprising speed control means on said machine comprising traction means adapted to tread upon the wall of the pipe to be lined, fly-wheel means, and reversible transmission means interconnecting said fly-wheel means with said traction means whereby the transmission couples the fly-wheel means to the traction means for transmission of energy from the traction means to the fly-wheel means and vice versa, said fly-wheel means having governor means rotatable therewith and brake means operable by said governor means in proportionate response to the speed of operation of said traction means and operable to apply braking force to said motion control means, said motion control means being operable to stabilize the motion of said traction means by the momentum of said fly-wheel means and to retard variably the speed of travel of said machine by operation of said brake means, remote mechanical force means for propelling said machine through the pipe comprising remote winch means, and draw cable means connecting said machine thereto.

2. In a pipe lining machine having a rotary distributor head adapted to apply lining material to the interior wall of a pipe while said machine travels therethrough, means for propelling the machine through a pipe, travel stabilizing means for said machine comprising traction wheels mounted thereon and engageable with the wall of the pipe to be lined, flywheel means likewise mounted on said machine, and transmission means having driving connection between said flywheel means and said traction wheels and adapted to transmit driving torque in either direction therethrough, whereby acceleration of said traction means transmits kinetic energy to said flywheel and deceleration of said traction means transmits kinetic energy from said flywheel means to said traction means.

3. In a pipe lining machine having a rotary distributor head adapted to apply lining material to the interior wall of a pipe while said machine travels therethrough, means for propelling the machine through a pipe, travel stabilizing means for said machine comprising traction wheels mounted thereon and engageable with the wall of the pipe to be lined, flywheel means likewise mounted on said machine, and transmission means having driving connection between said flywheel means and said traction wheels and adapted to transmit driving torque in either direction therethrough, whereby acceleration of said traction means transmits kinetic energy to said flywheel and deceleration of said traction means transmits kinetic energy from said flywheel means to said traction means, brake means operable upon said travel stabilizing means to retard the same, and speed responsive means for activating said brake means in response to overspeed of said travel stabilizing means.

4. In a pipe lining machine having a rotary distributor head adapted to apply lining material to the interior wall of a pipe while said machine travels therethrough, means for propelling the machine through a pipe, travel stabilizing means for said machine comprising traction wheels mounted thereon and engageable with the wall of the pipe to be lined, flywheel means likewise mounted on said machine, and transmission means having driving connection between said flywheel means and said traction wheels and adapted to transmit driving torque in either direction therethrough, whereby acceleration of said traction means transmits kinetic energy to said flywheel and deceleration of said traction means transmits kinetic energy from said flywheel means to said traction means, and brake means operable upon said travel stabilizing means to retard the same against overspeeding.

5. In a pipe lining machine having a rotary distributor head adapted to apply lining material to the interior wall of a pipe while said machine travels therethrough, travel stabilizing means for said machine comprising traction wheels mounted thereon and engageable with the wall of the pipe to be lined, flywheel means likewise mounted on said machine, and transmission means having driving connection between said flywheel means and said traction wheels and adapted to transmit driving torque in either direction therethrough, whereby acceleration of said traction means transmits kinetic energy to said flywheel and deceleration of said traction means transmits kinetic energy from said flywheel means to said traction means, remotely disposed force means, and a towing connection between said force means and said machine for drawing the same through said pipe.

6. In a pipe lining machine having a rotary distributor head adapted to apply lining material to the interior wall of a pipe while said machine travels therethrough, travel stabilizing means for said machine comprising traction wheels mounted thereon and engageable with the wall of the pipe to be lined, flywheel means likewise mounted on said machine, and transmission means having driving connection between said flywheel means and said traction wheels and adapted to transmit driving torque in either direction therethrough, whereby acceleration of said traction means transmits kinetic energy to said flywheel and deceleration of said traction means transmits kinetic energy from said flywheel means to said traction means, remotely disposed force means, a towing connection between said force means and said machine for drawing the same through said pipe, brake means operable upon said travel stabilizing means to retard the same, and speed responsive means for activating said brake means in response to overspeed of said travel stabilizing means.

7. In a pipe lining machine having a rotary distributor head adapted to apply lining material to the interior wall of a pipe while said machine travels therethrough, travel stabilizing means for said machine comprising traction wheels mounted thereon and engageable with the wall of the pipe to be lined, flywheel means likewise mounted on said machine, and transmission means having driving connection between said flywheel means and said traction wheels and adapted to transmit driving torque in either direction therethrough, whereby acceleration of said traction means transmits kinetic energy to said flywheel and deceleration of said traction means transmits kinetic energy from said flywheel means to said traction means, remotely disposed force means, a towing connection between said force means and said machine for drawing the same through said pipe, and brake means operable upon said travel stabilizing means to retard the same against overspeeding.

References Cited in the file of this patent

UNITED STATES PATENTS

| | | |
|---|---|---|
| 1,951,221 | Tate | Mar. 13, 1934 |
| 1,988,329 | Perkins | Jan. 15, 1935 |
| 2,099,346 | Perkins | Nov. 16, 1937 |
| 2,108,319 | Perkins | Nov. 16, 1937 |
| 2,326,823 | Brend | Aug. 17, 1943 |
| 2,352,768 | Brend | July 4, 1944 |
| 2,399,321 | Butler | Apr. 30, 1946 |
| 2,517,780 | Frank | Aug. 8, 1950 |
| 2,704,873 | Kirwan et al. | Mar. 29, 1955 |
| 2,758,352 | Perkins | Aug. 14, 1956 |

FOREIGN PATENTS

| | | |
|---|---|---|
| 738,227 | Great Britain | Oct. 12, 1955 |